(12) United States Patent
Byker

(10) Patent No.: US 10,457,091 B1
(45) Date of Patent: Oct. 29, 2019

(54) PAINTBRUSH HOLDING SYSTEM

(71) Applicant: Gary A. Byker, Hudsonville, MI (US)

(72) Inventor: Gary A. Byker, Hudsonville, MI (US)

( * ) Notice: Subject to any disclaimer, the term of this patent is extended or adjusted under 35 U.S.C. 154(b) by 111 days.

(21) Appl. No.: 15/586,428

(22) Filed: May 4, 2017

Related U.S. Application Data

(60) Provisional application No. 62/332,109, filed on May 5, 2016.

(51) Int. Cl.
  *B44D 3/12* (2006.01)
  *F16M 13/02* (2006.01)
  *F16M 11/22* (2006.01)
  *B44D 3/00* (2006.01)
  *B65D 25/10* (2006.01)
  *B65D 25/28* (2006.01)
  *B65D 43/02* (2006.01)

(52) U.S. Cl.
  CPC .............. *B44D 3/123* (2013.01); *B44D 3/006* (2013.01); *B44D 3/125* (2013.01); *B65D 25/10* (2013.01); *B65D 25/2835* (2013.01); *B65D 43/02* (2013.01); *F16M 11/22* (2013.01); *F16M 13/02* (2013.01)

(58) Field of Classification Search
  CPC ................................ B44D 3/123; B44D 3/125
  See application file for complete search history.

(56) References Cited

U.S. PATENT DOCUMENTS

| | | | | |
|---|---|---|---|---|
| 412,461 A * | 10/1889 | Canon | ...................... | A47K 1/09 |
| | | | | 312/206 |
| 2,472,001 A * | 5/1949 | Buhoveckey | .......... | B44D 3/125 |
| | | | | 206/209 |
| 2,521,049 A * | 9/1950 | Divis | ..................... | B44D 3/125 |
| | | | | 134/201 |
| 2,566,650 A * | 9/1951 | Anderson | .............. | B44D 3/125 |
| | | | | 211/65 |
| 2,744,635 A * | 5/1956 | Hiss | ....................... | B44D 3/125 |
| | | | | 118/500 |
| 2,936,878 A * | 5/1960 | Claude | ................... | B44D 3/125 |
| | | | | 206/209 |
| 2,952,364 A * | 9/1960 | Jacobson | ............... | B44D 3/123 |
| | | | | 211/65 |
| 3,141,712 A * | 7/1964 | Holmes | .................... | A47K 1/09 |
| | | | | 206/362.1 |
| 4,852,833 A * | 8/1989 | Lockwood | ............. | B44D 3/123 |
| | | | | 248/110 |
| 5,016,773 A * | 5/1991 | Lockwood | ............. | B44D 3/123 |
| | | | | 206/209 |

(Continued)

*Primary Examiner* — Jeffrey R Allen
*Assistant Examiner* — Jennifer Castriotta
(74) *Attorney, Agent, or Firm* — Gardner, Linn, Burkhart & Ondersma LLP

(57) ABSTRACT

A container for holding paintbrushes includes a bucket having an interior and a bottom, and a stand configured to be disposed in the interior. The stand includes a holder and a plurality of legs extending from the holder, with the legs configured to support the holder above the bottom of the bucket when the holder is disposed in the bucket with the legs positioned on said bottom of the bucket. The holder includes a plurality of hangers configured to removably receive paintbrushes thereon with the bucket configured to retain liquid into which the bristles of paintbrushes are submerged when retained on the hangers.

18 Claims, 6 Drawing Sheets

(56) References Cited

U.S. PATENT DOCUMENTS

| | | | | |
|---|---|---|---|---|
| 5,046,623 | A | * | 9/1991 | Takacs .................. B44D 3/125 211/65 |
| D324,541 | S | * | 3/1992 | Dudley ........................ D19/105 |
| 5,829,603 | A | * | 11/1998 | Martineau .............. A46B 17/06 211/66 |
| 5,836,446 | A | * | 11/1998 | Varnom ................. B25H 3/026 206/373 |
| 6,193,080 | B1 | * | 2/2001 | Castillo ................... B44D 3/12 211/66 |
| 7,819,366 | B2 | * | 10/2010 | Paga, Jr. ................ A46B 17/02 248/110 |
| 8,701,899 | B2 | * | 4/2014 | Paga ........................ A47F 5/01 211/181.1 |
| 2014/0102925 | A1 | * | 4/2014 | Jacobson ................. B25H 3/00 206/361 |
| 2015/0360505 | A1 | * | 12/2015 | Beck ...................... B44D 3/123 211/65 |

* cited by examiner

PAINTBRUSH HOLDING SYSTEM

CROSS REFERENCE TO RELATED APPLICATION

The present application claims priority of U.S. provisional application Ser. No. 62/332,109 filed May 5, 2016, which is hereby incorporated herein by reference in its entirety.

BACKGROUND OF THE INVENTION

The present invention is directed to a system and method for holding paintbrushes, and in particular paint brushes that have been used, such as to prevent the paint brushes from drying out.

SUMMARY OF THE INVENTION

The present invention provides a container system for holding and transporting paintbrushes, and in particular a container system that is able to retain the paintbrushes in a liquid to prevent the paintbrushes from drying out.

According to an aspect of the present invention, a container system for holding paintbrushes comprises a bucket having an interior and a bottom, and a stand configured to be disposed in the interior of the bucket. The stand includes a holder and a plurality of legs extending from the holder with the legs are configured to support the holder above the bottom of the bucket when the holder is disposed in the bucket with the legs positioned on the bottom of the bucket. The holder includes a plurality of hangers configured to removably receive paintbrushes thereon with the bucket configured to retain liquid into which the bristles of paintbrushes are submerged when retained on the hangers.

A system for holding paintbrushes in accordance with another aspect of the invention may comprise a container or bucket having an interior and a bottom, a holder configured to be disposed in the interior, with the holder including at least one hanger configured to removably receive a paintbrush thereon. The holder is configured to be positioned above the bottom of the bucket when the holder is disposed in the bucket with the bucket configured to retain liquid into which the bristles of the paintbrush are submerged when retained on the hanger.

In particular embodiments the system includes at least one leg extending from the holder, with the leg configured to support the holder above the bottom of the bucket when the holder is disposed in the bucket with the leg positioned on the bottom of the bucket. The holder may include one or more cross members and/or an outer perimeter wall, with hangers located on such cross members or outer walls. The bucket may include a handle and comprise a standard, generally cylindrical five gallon bucket.

In use, a liquid such as water is added to the bucket with the holder of the stand supporting paintbrushes on the hangers after the brushes have been used for painting, where the bristles of the paintbrushes are submerged in the water to thereby prevent the paintbrushes from drying out. The container is configured to hold multiple paintbrushes and may advantageously be used when the paintbrushes are stored for a period of time, such as overnight or while other projects are being performed. These and other objects, advantages, purposes and features of this invention will become apparent upon review of the following specification in conjunction with the drawings.

DESCRIPTION OF THE PREFERRED EMBODIMENTS

Figure 1:
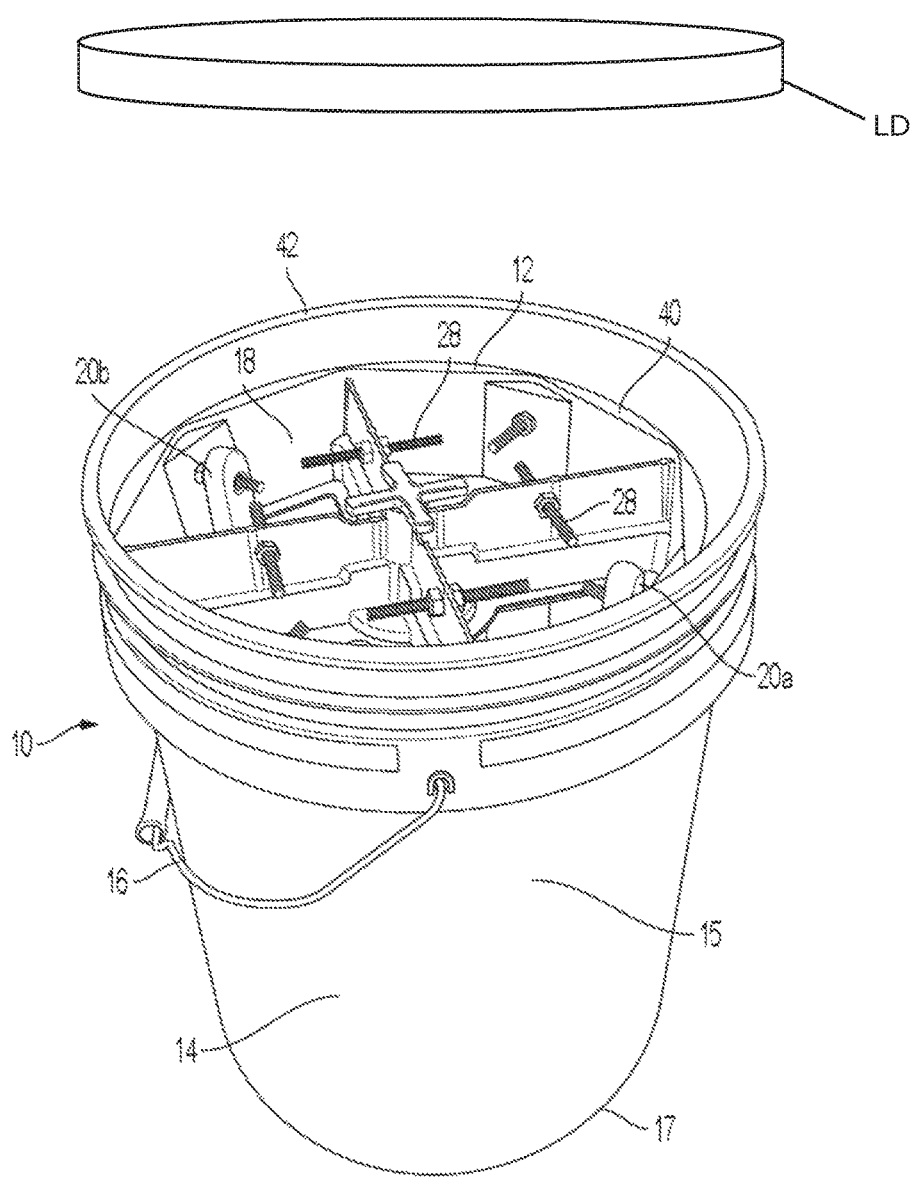
FIG. 1 is a perspective view of a paintbrush holding container system in accordance with an aspect of the present invention.
Figure 2:
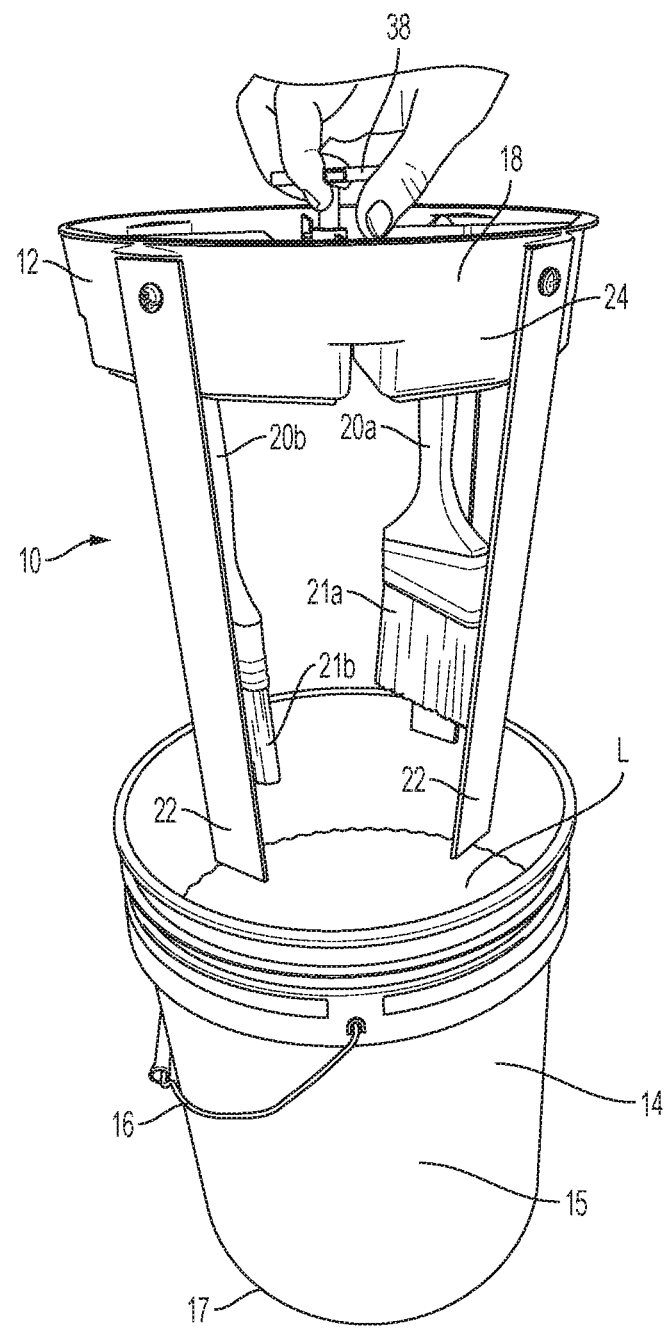
FIG. 2 is a perspective view of the paintbrush holding container of FIG. 1 shown with the inner brush stand shown above the bucket.
Figure 3:
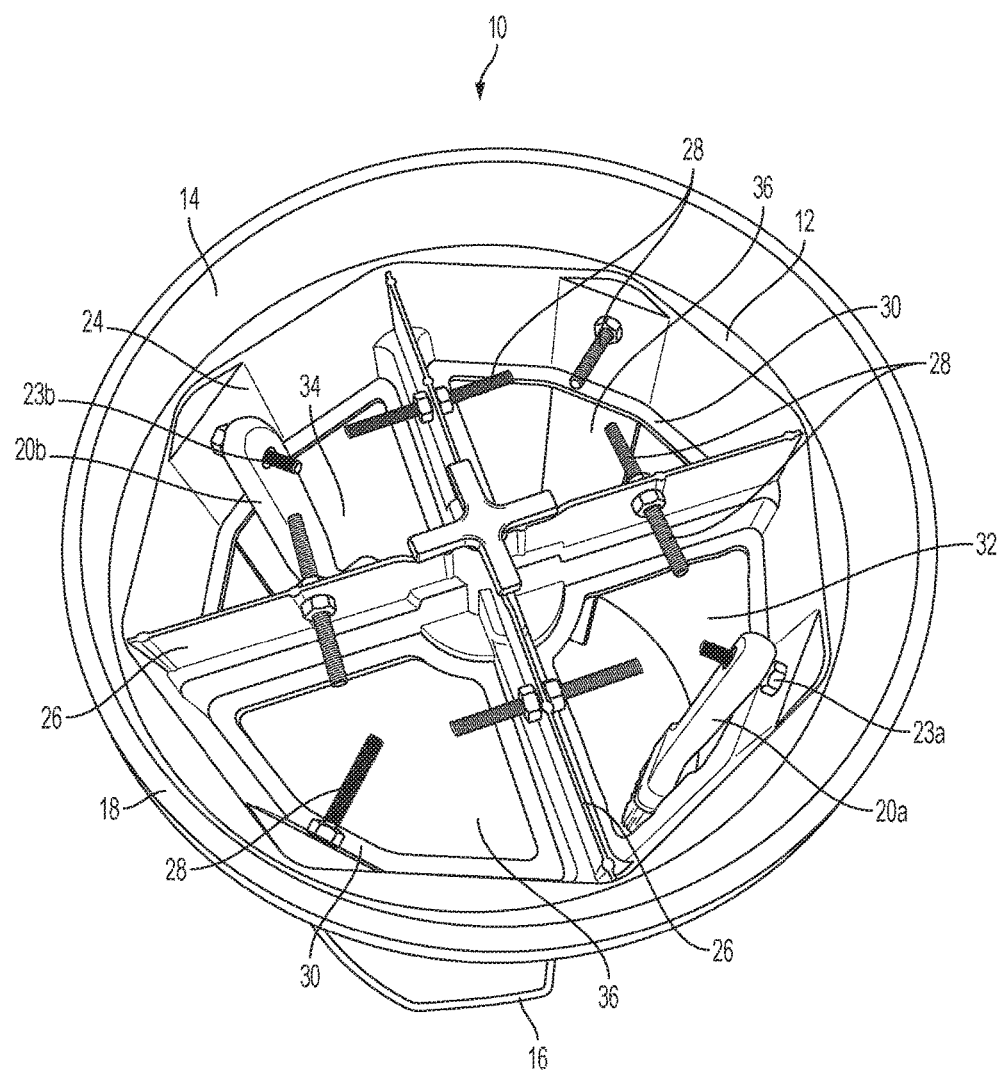
FIG. 3 is a top end perspective view of the paintbrush holding container of FIG. 1.

The present invention will now be described with reference to the accompanying figures, wherein the numbered elements in the following written description correspond to like-numbered elements in the figures. A paintbrush holding container or container system 10 is shown in FIGS. 1-3 to include an inner brush stand 12 and a container or bucket 14 with a handle 16. Stand 12 includes a holder 18 upon which paintbrushes 20a, 20b may be mounted, with stand 12 further including multiple legs 22. In use, a liquid L such as water may be added to bucket 14 with stand 12 supporting brushes 20a, 20b after the brushes 20a, 20b have been used for painting. The liquid in bucket 14 is filled to a level such that when stand 12 is located in bucket 14 the bristles 21a, 21b of brushes 20a, 20b are submerged in the liquid L whereby the bristles 21a, 21b are prevented from drying out. In particular, residue paint on the bristles is prevented from drying. Container 10 is configured to hold multiple paintbrushes, such as brushes that are being used by multiple painters or on a project requiring multiple brushes. Container 10 may advantageously be used when the paintbrushes are stored for a period of time, such as overnight or while other projects are being performed, whereby the useful life of brushes 20a, 20b may therefore be extended. Container 10 may additionally or alternatively be used for cleaning paintbrushes.

The illustrated embodiment of paintbrush holding container 10 includes a conventional bucket 14, such as a standard five gallon bucket with handle 16. Bucket 14, which is generally cylindrical, includes a vertically upright wall 15 and a bottom 17 forming or defining the interior of the bucket 14. It should be appreciated that alternatively sized and shaped buckets may be employed within the scope of the present invention, including for use with alternative numbers or sized paintbrushes. However, the use of a five gallon bucket is advantageous due to the commonality of such buckets, including in the painting industry. For example, the system may be readily configured based on existing such buckets, and further, is readily transportable by painters and the like that utilize paint and other materials in five gallon buckets whereby transportation of the container system.

Stand 12 in the illustrated embodiment includes four legs 22 that extend downwardly from holder 18, with the legs 22 being disposed generally equally about holder 18 and holder 18 disposed at and forming an upper portion of stand 12. Holder 18 includes an outer perimeter circumferentially disposed wall 24 and a pair of sectional walls or cross members 26 with multiple hangers or hooks 28 disposed on wall 24 and cross members 26. As understood from FIGS. 3 and 4, for example, hangers 28 are configured to support paintbrushes, such as paintbrushes 20a, 20b, via mounting holes 23a, 23b on handles 25a, 25b of the paintbrushes 20a, 20b. In the illustrated embodiment hangers 28 are formed as threaded members that are secured via nuts to holder 18. Alternative hangers may be provided however.

Figure 4:
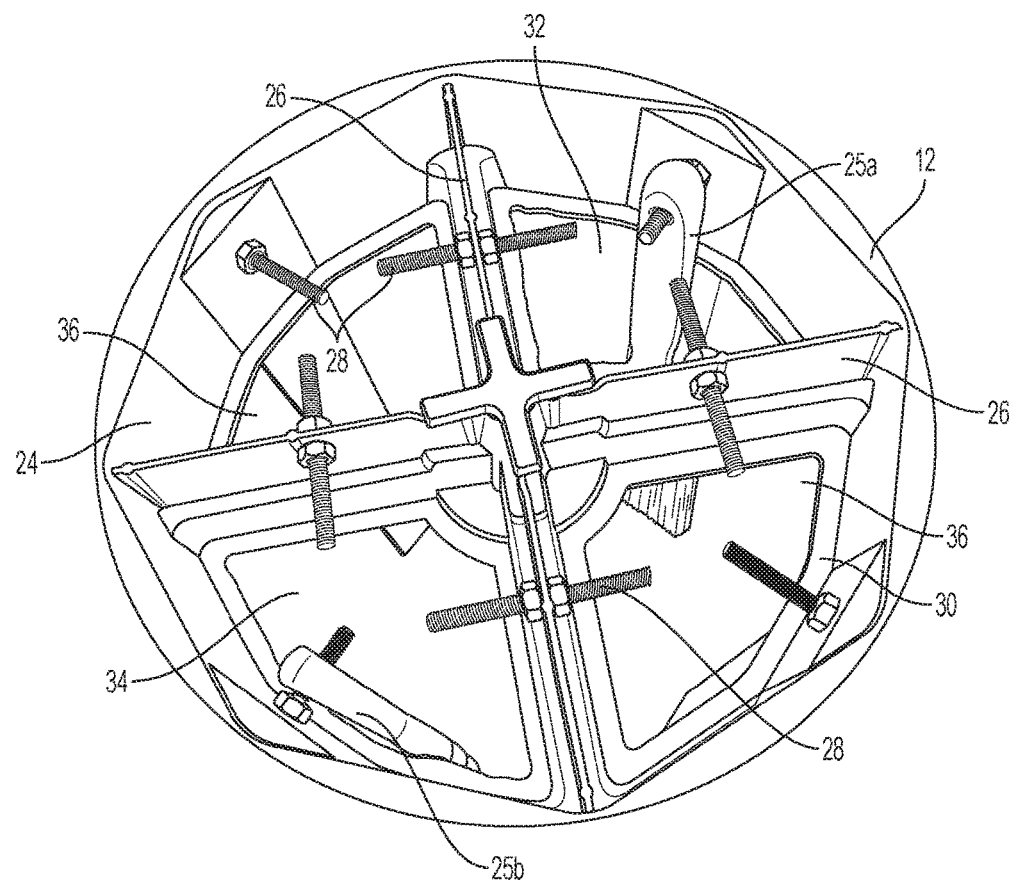
FIG. 4 is a top end perspective view of the inner brush stand removed from the bucket.
Figure 5:
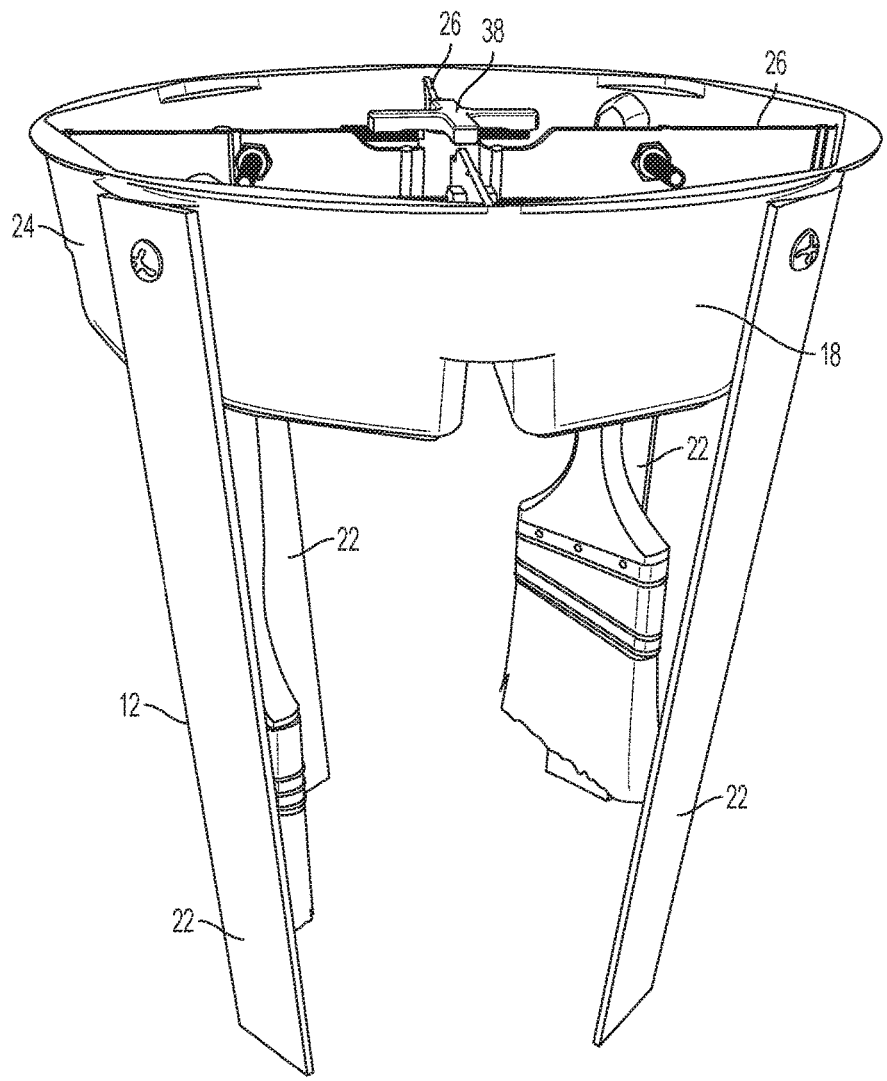
FIG. 5 is a perspective view of the inner brush stand of FIG. 4.
Figure 6:
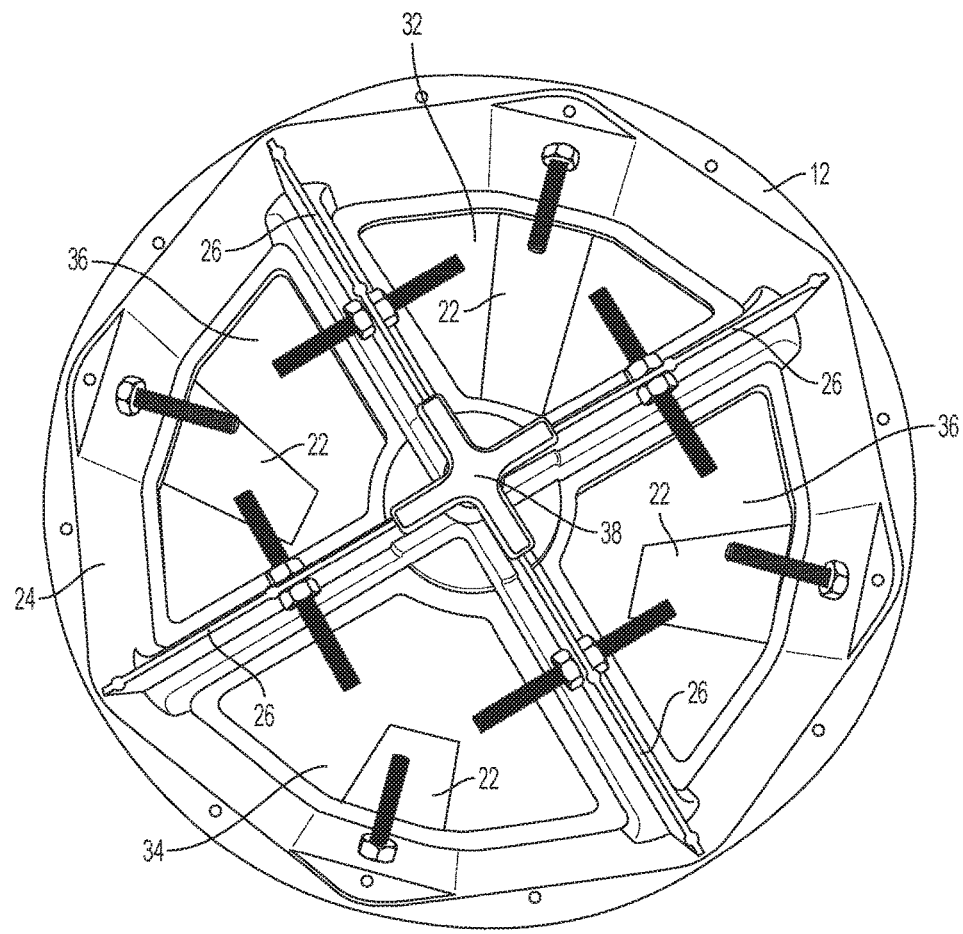
FIG. 6 is a top end perspective view of the inner brush stand of FIG. 4 shown with the paintbrushes removed.

Legs 22 are mounted to wall 24 thereby enabling paintbrushes 20a, 20b to hang down and be located in the interior or central area within bucket 14. In the illustrated embodiment, legs 22 are mounted to wall 24 with fasteners that extend through wall 24 to additionally form selected ones of the hangers 28. Holder 18, as seen in FIG. 4, includes a base wall 30 having apertures 32, 34 therein through which paintbrushes 20a, 20b extend when mounted on hangers 28, as well as additional apertures 36 that may be used for other paintbrushes. Alternatively, however, holder 18 may be formed to include alternatively formed or sized apertures, or an alternative number of apertures. For example, holder 18 may be formed to include more than four such apertures, or multiple apertures within the separate quadrants separated by the cross members 26. Stand 12 further includes a lift handle 38, which in the illustrated embodiment is integrally affixed to holder 18 and comprises a handle that telescopes into and out of holder 18.

It should be appreciated that stand 12 may be alternatively configured within the scope of the present invention. For example, rather than separately formed legs, a holder with integrally or unitarily formed legs may be provided, such as either formed of metal or plastic. Still further, additional or fewer legs may be provided, including a single, central leg whereby holder may be additionally supported against sidewall 15. Still other alternative constructions to support holder in the interior and above the bottom of a bucket may be provided. An alternative holder may be formed to not include either a bottom wall or cross members, or may be constructed without a circumferential wall. Alternative numbers of and formed hangers or hooks may also be provided, including hooks that are not straight and/or are integrally formed with holder, such as by molding.

When stand 12 is disposed within bucket 10, handle 16 may be used to transport and carry container 10. Moreover, as understood from FIG. 1, when stand 12 is disposed within bucket 10 the upper edge 40 of holder 18 is disposed lower than the upper rim 42 of bucket 10. That is the top of holder 18 is below the top of bucket 14 to be fully contained therein. Thus the height of bucket 10 is greater than the height of stand 12. A conventional lid LD (FIG. 1) for bucket 14 may be secured to rim 42 of bucket 10 to aid in retention of stand 12, paintbrushes 20a, 20b, and liquid within bucket 14. Although bucket 10 and holder 18 are disclosed as being circular, it should be appreciated that alternatively shaped buckets and/or holders may be employed. For example, a bucket and holder having a generally rectangular or square cross section may be used as a paintbrush holding container within the scope of the present invention.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A system for holding paintbrushes, said system comprising:
    a container having an interior and a bottom; and
    a holder configured to be disposed in said interior, said holder including a circumferentially disposed cylindrical wall and a pair of intersecting cross walls that are each connected to an interior of said cylindrical wall, a plurality of legs, wherein each of said legs is connected to said cylindrical wall with each leg being spaced circumferentially between each connection of said pair of cross walls with said cylindrical wall, and a plurality of hangers fixedly secured to said holder with each hanger configured to removably receive a paintbrush thereon;
    wherein each of said cross walls include at least one of said hangers, and wherein at least one of said hangers is disposed at the connection of each leg with said cylindrical wall, and wherein said holder is positioned above said bottom of said container when said holder is disposed in said container with said container configured to retain liquid into which the bristles of the paintbrush are submerged when retained on said hanger.

2. The system of claim 1, wherein said legs extend from said holder, and wherein said legs are configured to support said holder above said bottom of said container when said holder is disposed in said container with said legs positioned on said bottom of said container.

3. The system of claim 1, wherein said holder includes a lift handle integrally affixed to said holder, and wherein said lift handle telescopes into and out of said holder.

4. The system of claim 1, wherein each cross wall divides a respective cross wall in half, wherein at least one of said hangers is disposed on each of said legs, and wherein at least one of said hangers is disposed on each half of said pair of intersecting cross walls.

5. The system of claim 4, wherein each of said legs is mounted to said cylindrical wall with a fastener that extends through said cylindrical wall to form at least one hanger disposed on each of said legs.

6. The system of claim 1, wherein each side of each cross wall of said pair of cross walls includes at least one hanger.

7. The system of claim 6, wherein at least one hanger on one side of said cross wall of said pair of cross walls is aligned with at least one hanger on an opposite side of said cross wall.

8. The system of claim 7, wherein each of the hangers is secured to a respective side of said cross wall by a lock nut.

9. The system of claim 1, wherein said holder includes a base wall having a plurality of apertures through which paintbrushes are configured to extend.

10. The system of claim 1, wherein said container comprises a bucket.

11. The system of claim 10, wherein said bucket includes a handle, and wherein said bucket is generally cylindrical.

12. The system of claim 11, further including a lid for said bucket.

13. A container for holding paintbrushes, said container comprising:
    a bucket having an interior and a bottom; and
    a stand configured to be disposed in said interior, said stand comprising a holder and a plurality of legs extending from said holder, said holder including a circumferentially disposed cylindrical wall and a pair of intersecting cross walls that are each connected to an interior of said cylindrical wall, wherein each of said legs is connected to said cylindrical wall with each leg being spaced circumferentially between each connection of said pair of cross walls with said cylindrical wall, wherein said legs are configured to support said holder above said bottom of said bucket when said holder is disposed in said bucket with said legs positioned on said bottom of said bucket;
    said holder including a lift handle integrally affixed to said holder, wherein said lift handle telescopes into and out of said holder, and a plurality of hangers fixed securely to said holder with each hanger configured to removably receive a paintbrush thereon and with said bucket configured to retain liquid into which bristles of the paintbrushes are submerged when retained on said hangers.

14. The container of claim 13, wherein each of said cross walls include at least one of said hangers, and wherein at least one of said hangers is disposed at the connection of each leg with said cylindrical wall.

15. The container of claim 14, wherein each cross wall divides a respective cross wall in half, wherein at least one of said hangers is disposed on each of said legs, and wherein at least one of said hangers is disposed on each half of said pair of intersecting cross walls.

16. The container of claim 15, wherein each of said legs is mounted to said cylindrical wall with a fastener that extends through said cylindrical wall to form at least one hanger disposed on each of said legs.

17. The container of claim 13, wherein each of the hangers is secured to a respective side of said cross wall by a lock nut.

18. The container of claim 13, wherein said holder includes a base wall having a plurality of apertures through which paintbrushes are configured to extend.

* * * * *